United States Patent
Kitain et al.

(10) Patent No.: US 7,246,134 B1
(45) Date of Patent: Jul. 17, 2007

(54) SYSTEM AND METHODS FOR TAG LIBRARY GENERATION

(75) Inventors: Roger W. Kitain, Littleton, MA (US); Craig R. McClanahan, Tualatin, OR (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 10/793,465

(22) Filed: Mar. 4, 2004

(51) Int. Cl.
*G06F 7/00* (2006.01)
*G06F 15/00* (2006.01)

(52) U.S. Cl. ..................... 707/102; 715/513
(58) Field of Classification Search ............... 707/102, 707/103 Y, 6, 513; 715/513–515
See application file for complete search history.

(56) References Cited

U.S. PATENT DOCUMENTS

| | | | |
|---|---|---|---|
| 6,981,211 B1* | 12/2005 | Claussen et al. | 715/513 |
| 6,981,212 B1* | 12/2005 | Claussen et al. | 715/513 |
| 2002/0099738 A1* | 7/2002 | Grant | 707/513 |

* cited by examiner

*Primary Examiner*—Don Wong
*Assistant Examiner*—Hung Tran Vy
(74) *Attorney, Agent, or Firm*—Chapin IP Law, LLC; Barry W. Chapin, Esq.

(57) ABSTRACT

Conventional tag libraries facilitate web page development by referencing external code from within an HTML page via a mnemonic tag, however such conventional tag libraries typically rely on a manually generated set of supporting code. Such supporting code typically requires a thorough knowledge of the underlying code language, such as Java, C++ and Java Server Pages (JSP). A tag library generator for generating the supporting code corresponding to a tag library mitigates the shortcomings of manually generated support code by parsing a metadata file defining the operations and functions provided by the supporting code. The parser extracts components and renderers corresponding to the supporting code. Each of the components may have corresponding properties, and each of the renderers may have corresponding attributes, which the parser also extracts. The tag library generator receives the parsed items, and processes each of the components with corresponding renderers to generate the applicable support code. The support code includes a tag library descriptor defining the tags whose attributes are a combination of component properties and renderer attributes, a tag handler class definition, in which each tag handler class corresponds to a "tag" entry in the TLD file, and component objects for maintaining the state of web output pages.

19 Claims, 6 Drawing Sheets

SYSTEM AND METHODS FOR TAG LIBRARY GENERATION

BACKGROUND OF THE INVENTION

In an information network operable for remote access, servers typically communicate with clients via output pages transmitted over the network for displaying output and receiving input from users. In a remote access network such as the Internet, the output pages often take the form of Hypertext Markup Language (HTML) script pages, commonly known as web pages. A user accesses the server from a browser application running on a client computer system (client), and the web server (server) responds with a series of web pages as directed by the browser under user control. The server typically builds the web pages by compiling and executing the HTML script and other code corresponding to the requested page. The server transmits the web page to the user for displaying output fields, and also receives input from the user via input fields on the output web page.

A sequence or hierarchy of web pages typically forms a graphical user interface (GUI) from the client to a remote application running on the server. Such a remote application may provide various services and functions on behalf of the user, such as email, retail purchases, media display (e.g. streaming audio/video), electronic auctions, remote system monitoring and operations, etc. Accordingly, such GUIs may become large and complex, incorporating a large number of web pages arranged in a navigational format for traversal by the user. Further, such web pages often incorporate various aesthetic features in the form of graphics, photographic images, fonts, and formatting. Such aesthetic features may incorporate nontechnical aspects such as marketing, artistic expression, and graphical design, depending on the context or target audience of the web pages.

However, the technical content of web pages often incorporate a variety of languages, scripts, and other extensions to the general HTML framework, for example Java based invocations such as JavaServer Pages (JSP), Extensible Markup Language (XML) code, and other execution based extensions. Often, the aesthetic content developers of a conventional web page may be from backgrounds such as graphic design and artistic layout and accordingly, may not be proficient in the technical aspects of web page generation. Therefore, technical personnel conversant in the underlying technology are required to translate the aesthetic concepts into codified representations in the web pages (output pages).

Conventional development facilities exist, however, to attempt to bridge the proficiency gap between technical and artistic contributors to web page development. One such facility is so called "Custom Tag Libraries," which link portions of executable code to mnemonic labels, or tags, which a user embeds in an HTML file. The conventional user then need merely employ the mnemonic tag name to invoke the corresponding code in the web page display, typically invoking JSP code or other Java based code facilities known to those of skill in the art. The user need not develop or even be familiar with the underlying code corresponding to the tag. However, such conventional tag libraries typically employ substantial support code in conjunction with the tag invocation from the web page. The support code typically takes the form of parallel code files, and may be voluminous in order to support a beneficial number of tags. Accordingly, technically versed coders typically provide manual development of the support code accompanying a conventional custom tag library.

SUMMARY

Conventional web based applications typically employ a sequence of web output pages for providing a remote graphical user interface (GUI) to an application. Typical web pages are generally HTML scripts transmitted and interpreted by a browser on the client computer system. However, HTML generation may be augmented by server-side programming framework for creating dynamic output to provide runtime support for embedding dynamic executable operations and functions into a web page. Such extensions also provide GUI support simplifying formatting, translation, and display of input and output fields on the web page. One such extension is JavaServer faces (JSF), which provides user interface support for such web page GUIs.

JSF implementations build off of JSP tag libraries for displaying GUI artifacts such as I/O fields. JavaServer Faces technology simplifies the building of user interfaces for JavaServer applications. Developers of various skill levels may quickly and easily build web applications by assembling reusable UI components in a page, connecting these components to an application data source, and wiring client-generated events to server-side event handlers. In this manner, JSF provides coding of components corresponding to portions of the GUI screen, associates the components to renderers indicative of formatting, validation, and conversion, and handles transporting the GUI data between the client and server application.

Typically, such a programming framework for facilitating HTML delivery, such as JSF, facilitates GUI screen deployment via a JavaServer Pages (JSP) custom tag library for expressing a JavaServer Faces interface within a JSP supported output page. A JSF user interface employs components as the basic building block for creating a JSF user interface. A particular component represents a configurable and reusable element in the user interface, which may range in complexity from simple (such as a button or text field) to compound (such as a tree control or table). The components may be generic, and independent of the transport/deployment platform, such as TCP/IP transport of HTML, or may be platform specific. Generally, such standard UI components (Generic) contain properties that are not specific to rendering, or displaying—e.g.: "value." Standard components may also contain render-dependent attributes (ex: size, color), but such components would be stored in a generic attribute set. Standard, or HTML-specific, components also contains renderer-dependent attributes (exposed as properties, such as size and color), and provide more robust support for tools where rendering is performed in HTML.

Configurations of the invention are based, in part, on the observation that conventional tag libraries employ substantial supporting code and related objects for receiving, translating, formatting and maintaining a user's web page in a browser session. Conventional tag libraries facilitate web page development by referencing external code from within an HTML page via the mnemonic tag. While tag libraries allow embedding of Java based operations by invoking corresponding Java code from web page output languages such as HTML, such conventional tag libraries rely on a manually generated set of supporting code. Such supporting code, including tag library descriptors (TLDs), tag handler classes, and component classes typically require a thorough knowledge of the underlying code language, such as Java and Java Server Pages (JSP). Typically, web page designers are knowledgeable in more aesthetic aspect of GUI development such as graphic and layout principles, and typically may not be fluent in code languages employed for executing and displaying such web pages. Accordingly, gathering the skills for conventional web output page generation can be cumbersome and expensive, requiring proficiency in both aesthetic design and technical fluency in web page languages, or employing multiple operators and/or designers who collectively exhibit the ideal skill set.

The invention as defined by the present claims substantially overcomes the shortcomings presented by conventional tag library implementations by providing a tag library generator for generating the supporting code corresponding to a tag library. A metadata file describes the operations and functions provided by the supporting code. A parser extracts components and renderers corresponding to the supporting code. Each of the components may have corresponding properties, and each of the renderers may have corresponding attributes, which the parser also extracts. The tag library generator receives the parsed items, and processes each of the components with corresponding renderers to generate the applicable support code. The support code includes a tag library descriptor defining the tags whose attributes are a combination of component properties and renderer attributes, a tag handler class definition for each of the components and renderers, and component objects for maintaining the state of web output pages.

In further detail, the tag library generator provides a method for generating a code library from metadata definitions by parsing a metadata definition of components having properties and renderers having attributes. The tag library generator generates, for each of the components, tag library descriptors corresponding to the renderers, in which the descriptors are indicative of compatible attributes for the corresponding component and applicable properties. The tag library generator also generates, for each of the components, the tag handler class corresponding to the renderers operable with the component, in which the tag class including methods operable to generate portions of the output page. The tag library further generates a component object corresponding to each of the components and operable to maintain data attributable to generated portion of the output page. Therefore, the tag library generator includes at least three generation processes including a tag library generator, a handler class generator, and a component generator, collectively generating the supporting code files for the corresponding tags.

In the particular exemplary configuration, the components correspond to portions of the output page and the renderers correspond to formatting the portions of the output page, each of the portions operable as an interface for user input or output. The components are tag components operable to be referenced from user code by the tag, in which the tag component is indicative of generation of code corresponding to the tag and operable to be invoked from the tag by the user code. Further, each of the tags may include properties, and the user code invoking the tag includes the tags inline in the code and specifies the corresponding properties. The compiled tag is then operable to generate code corresponding to the included properties, similar to passing a parameter to the referenced tag.

In the particular exemplary configuration disclosed, the components are user interface components operable to execute code corresponding to a display item on the output page, and interoperate with JSF for providing automated code generation support for a set of HTML based user interface pages, or screens. The resulting user code developed in conjunction with the compiled tags as discussed herein is operable to generate the output page, including parsing and compiling the user code to generate an executable entity, such as a servlet, identifying the tags embedded in the user code, invoking the descriptors and classes corresponding to the embedded tags, and generating the code corresponding to the identified tags. The servlet, as is knows to those of skill in the art, is a compiled executable entity for producing an output page to a user, which generally includes output statements and interleaved Java code resulting from the compiled tag.

In the particular exemplary configuration disclosed below, compiling the user code further includes mapping the properties in the user code to the corresponding components and renderers, and selectively generating the output code from the components and renderers corresponding to the mapped properties and conditional state decisions executed by the compiled code. A JSP engine then renders the output page to the user by displaying portions of the output page according to the generated output code. The JSP engine, or other processing engine, then maintains the state of the rendered page by identifying, in the component object, state instances of each of a plurality of rendered pages. Thus, each page corresponds to an instantiated component object which stores values across successive invocations, or fetches, of the output page, allowing a developer to build an application having a serial or hierarchical user interface page structure that maintains a state from invocation to invocation.

The invention as disclosed above is described as implemented on a computer having a processor, memory, and interface operable for performing the steps and methods for generating and referencing a code library via metadata definitions as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Conventional tag libraries facilitate web page development by referencing external code from within an HTML page via the mnemonic tag. Such a mnemonic tag provides a vehicle for non-technical developers to employ more complex structures and executable code entities without direct code interaction. However, such conventional tag libraries tend to employ substantial supporting code and related objects for receiving, translating, formatting and maintaining a user's web page in a browser session. While tag libraries allow embedding of Java based operations by invoking corresponding Java code from web page output languages such as HTML, such conventional tag libraries relay on a manually generated set of supporting code. Such supporting code, including tag library descriptors (TLDs), tag handler classes, and component classes typically require a thorough knowledge of the underlying code language, such as Java, C++ and Java Server Pages (JSP).

In a typical web page development environment, web page designers are knowledgeable in more aesthetic aspect of GUI development such as graphic and layout principles, and typically are not fluent in code languages employed for executing and displaying such web pages. Further, the modern proliferation of web based commerce has created a demand for artistic and aesthetic characteristics in a web page, independently of the underlying technical details. Accordingly, gathering the skills for conventional web output page generation can be cumbersome and expensive, requiring proficiency in both aesthetic design and technical fluency in web page languages, or employing multiple operators and/or designers who collectively exhibit the ideal skill set.

The invention as defined by the present claims provides a tag library generator for generating the supporting code corresponding to a tag library. A metadata file describes the operations and functions provided by the supporting code. A parser extracts components and renderers corresponding to the supporting code. Each of the components may have corresponding properties, and each of the renderers may have corresponding attributes, which the parser also extracts. The tag library generator receives the parsed items, and processes each of the components with the corresponding renderers to generate the applicable support code. The support code includes a tag library descriptor (TLD) defining the tags whose attributes are a combination of component properties and renderer attributes, a tag handler class definition for each of the components and renderers, in which each tag handler class corresponds to a "tag" entry in the TLD file, and component objects for maintaining the state of web output pages, now described in greater detail with respect to FIGS. 1-6.

Figure 1:
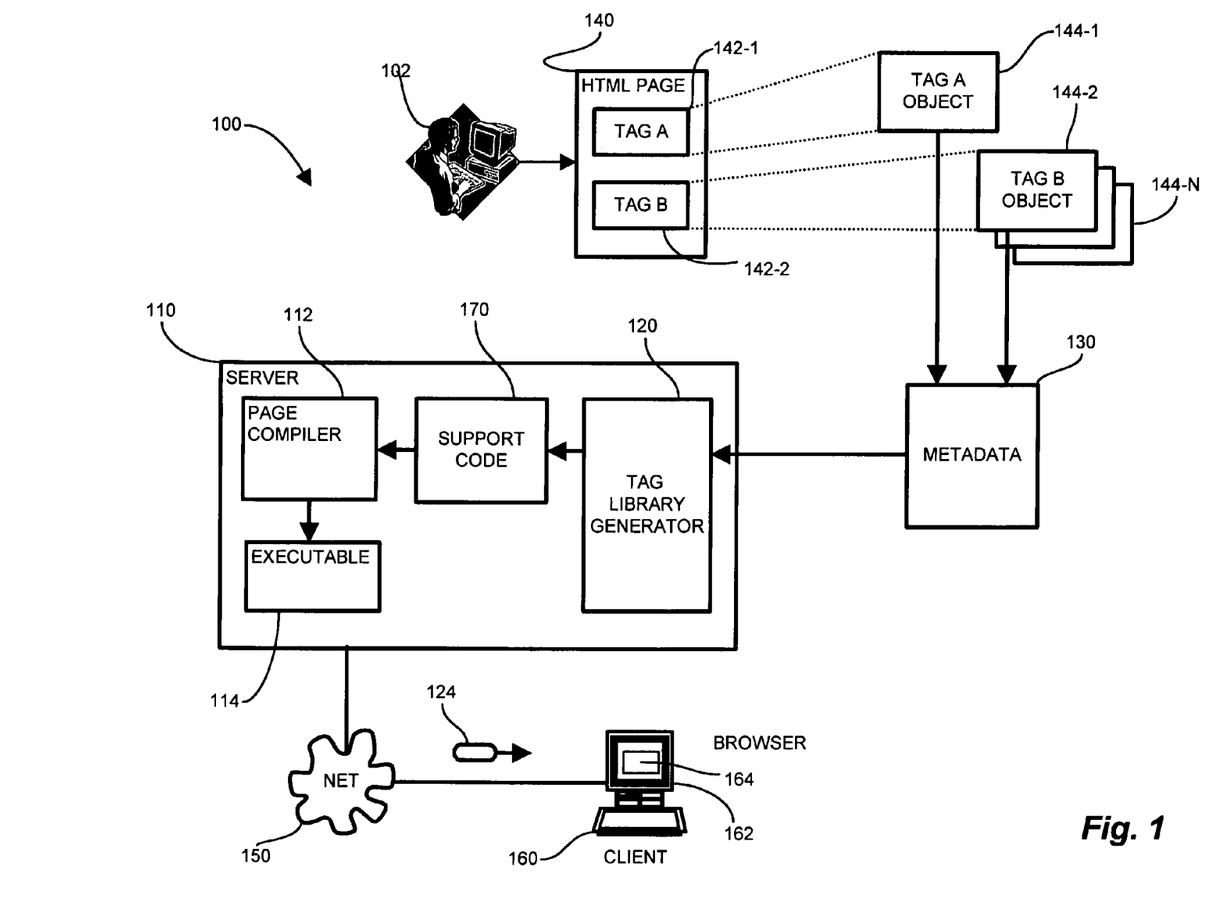
FIG. 1 is a context diagram of a GUI development environment suitable for use with the present invention.

FIG. 1 is a context diagram of a GUI development and deployment environment suitable for use with the present invention. Referring to FIG. 1, the development environment 100 includes a server 110 having a page compiler 112 for generating an executable object 114, such as a servlet, described further below. The server 110 receives a web page 140 from a web developer 102. The web page 140 is adapted to include tags 142-1,142-2 (142 generally) corresponding to tag code objects 144-1,144-2 (144-N, generally), respectively. The developer 102 inserts the tags 142 for subsequent compilation of the corresponding code object 144 in place of the tag 142.

The page compiler 112 employs supporting code 170 for compiling the tag code objects 144 into the web page 140 at the point of the corresponding tag 142. The server 110 invokes a metadata definitions file 130 for generating the supporting code 170. A tag library generator 120 generates the support code 170 for compilation into the corresponding executable 114, described further below. The server 110 is operable for deployment of compiled web pages to clients 160 at a browser application 162 via a public access network 150 such as the Internet. Appendix A, below, illustrates an exemplary metadata definition (file) 130, as shown more specifically via line references below. It should be noted, furthermore, that the support code 170 includes multiple artifacts, discussed further below, which emanate from the same metadata, thus simplifying development because the metadata is effectively reused to generate each of the employed artifacts.

Figure 2:
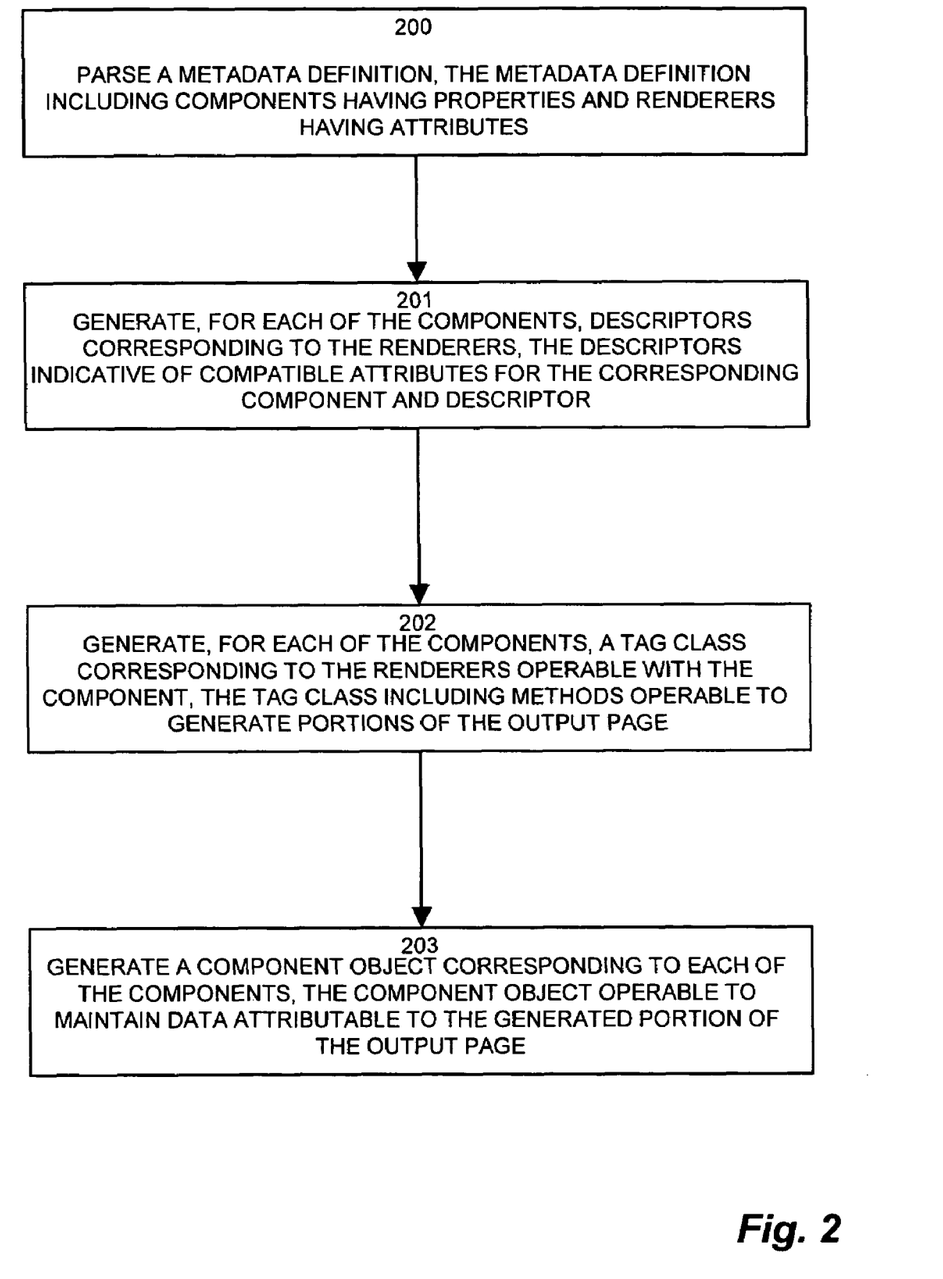
FIG. 2 is a flowchart of the system of the present invention.

FIG. 2 is a flowchart of the system of the present invention according to an exemplary configuration in the context of FIG. 1. In the exemplary configuration disclosed, the metadata definitions 130 are an XML file employed for generating JSF based output portions on an HTML output page 164. The method for generating a code library from metadata as disclosed herein entails parsing a metadata definition 130 which includes components having properties and renderers having attributes, as depicted at step 200. The tag library generator 120 employs the metadata for generating supporting code 170, discussed in further detail below, for supporting usage of the tags in the user HTML code 140. Accordingly, the tag library generator 120 processes the metadata definition 130 to generate, for each of the components, one or more descriptors corresponding to the renderers, in which the descriptors are indicative of compatible attributes for the corresponding component and descriptor. The tag library generator iterates through the metadata 130 for each component, and for each component, iterates through the applicable descriptors, as depicted at step 201. The tag library generator produces a set of tag library descriptors, which are portions of code for incorporation into a tag library descriptor file, discussed further below. The tag library descriptor file identifies valid attributes and properties for the tag library objects, which the user specifies in the HTML code reference to the tag library objects.

The tag library generator 120 then generates, for each of the components, a tag handler class corresponding to the renderers operable with the component, in which the tag handler class including methods operable to generate portions of the output page 164, as depicted at step 202. The tag handler class, discussed further below, is a class corresponding to instantiated tag objects 144 having the actual code to be invoked by the HTML page 140 by the tag 142. In other words, the tag objects 144 are, in effect, "substituted" for the code in the resultant HTML output page 164.

The tag library generator 120, following processing of the applicable components and renderers, generates a component object corresponding to the components, which maintains data attributable to the generated portion of the output page 164, as depicted at step 203. The component object is instantiated for each instantiation of a particular output page 164, and maintains state variables for facilitating successive fetches of the output page 164. In this manner, the state variables of the generated tag objects 144 remain persistent across multiple references to the corresponding output page 164. One common example of persistent state is an Internet shopping cart, in which items enumerated on the page representing the shopping cart remain persistent throughout the session until the user elects to checkout.

It should be noted that the exemplary implementation discussed above employs an output report as an HTML web page, as is characteristic of typical web based applications. The systems and methods discussed above, including the exemplary parsing and syntax processing of metadata descriptors in a declarative language, are applicable to other output formats from in an information processing environment. Accordingly, the systems and methods discussed above with respect to the exemplary XML output pages are applicable to an alternative scripting or processing format or protocol operable for responsive delivery and display to a user. Such alternate configurations may include non-XML metadata and/or UI components employing other non-Java based implementations.

Figure 3:
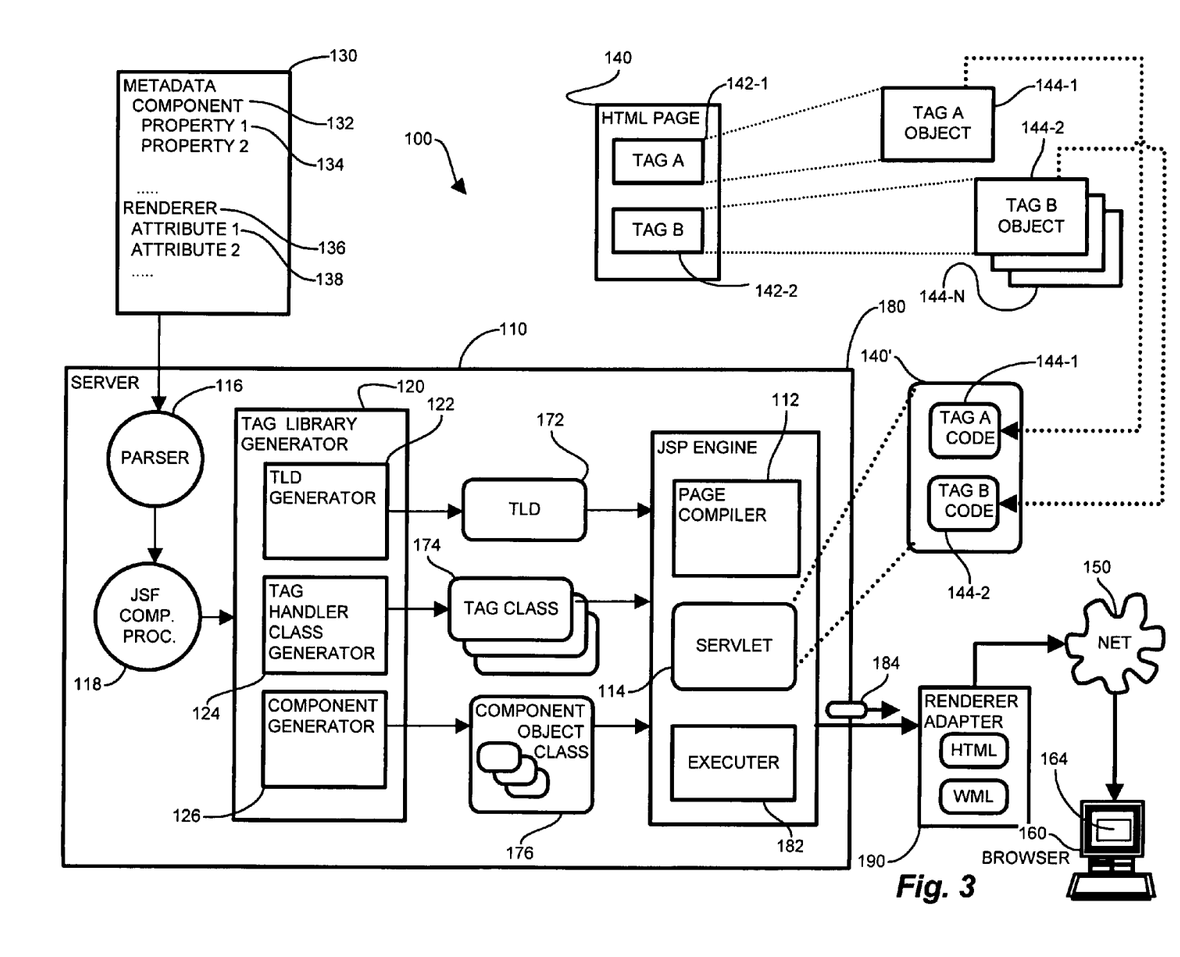
FIG. 3 is a diagram of the web page server and client in the environment of FIG. 1.

FIG. 3 is a diagram of the server and client in the environment of FIG. 1 in greater detail. Referring to FIG. 3, the metadata definitions file 130 includes components 132 and renderers. Each of the components 132 includes properties 134 and each of the renderers 136 includes attributes 138. Generally, as indicted above, the components 132 correspond to portions of the GUI screen web page 140 for display, and the renderers 136 define formatting, validation, and conversion of the fields in the component 132.

A parser 116 parses the components 132 and renderers 136 from the metadata file 130, and passes it to a JSP component processor 118 for processing the components 132 and renderers 136 and passing them to the tag library generator 120. Appendix A illustrates exemplary components and renderers in the code fragments shown at lines 45 . . . 82 and 85 . . . 124, respectively. The tag library generator 120 includes a tag library descriptor (TLD) generator 122, a tag handler class generator 124, and a component generator 126. Alternate configurations may employ the tag library generator 120 as an integrated process; the illustrated entities 172, 174, 176 is not intended to convey a physical process separation. The tag library descriptor generator 122 generates tag library descriptors 172 for including in the tag library descriptor file. The tag handler class generator 124 generates the actual code objects, or classes, corresponding to the components 132 and descriptors 136 in the metadata 130. The generated tag handler classes, or artifacts, include tag library descriptors 172, tag handler classes 174, and a component object 176. As indicated above, each of the artifacts employ the same metadata definition 130, therefore alleviating the developer from such manual development, which in the exemplary configuration typically requires transcribing each property or attribute three times. A JSP engine 180 employs the generated support code 172, 174, 176 via the compiler 112 to generate the servlet 114, adapted for execution by an executer 182, as will now be discussed in further detail with respect to FIGS. 4 . . . 6.

Figure 4:
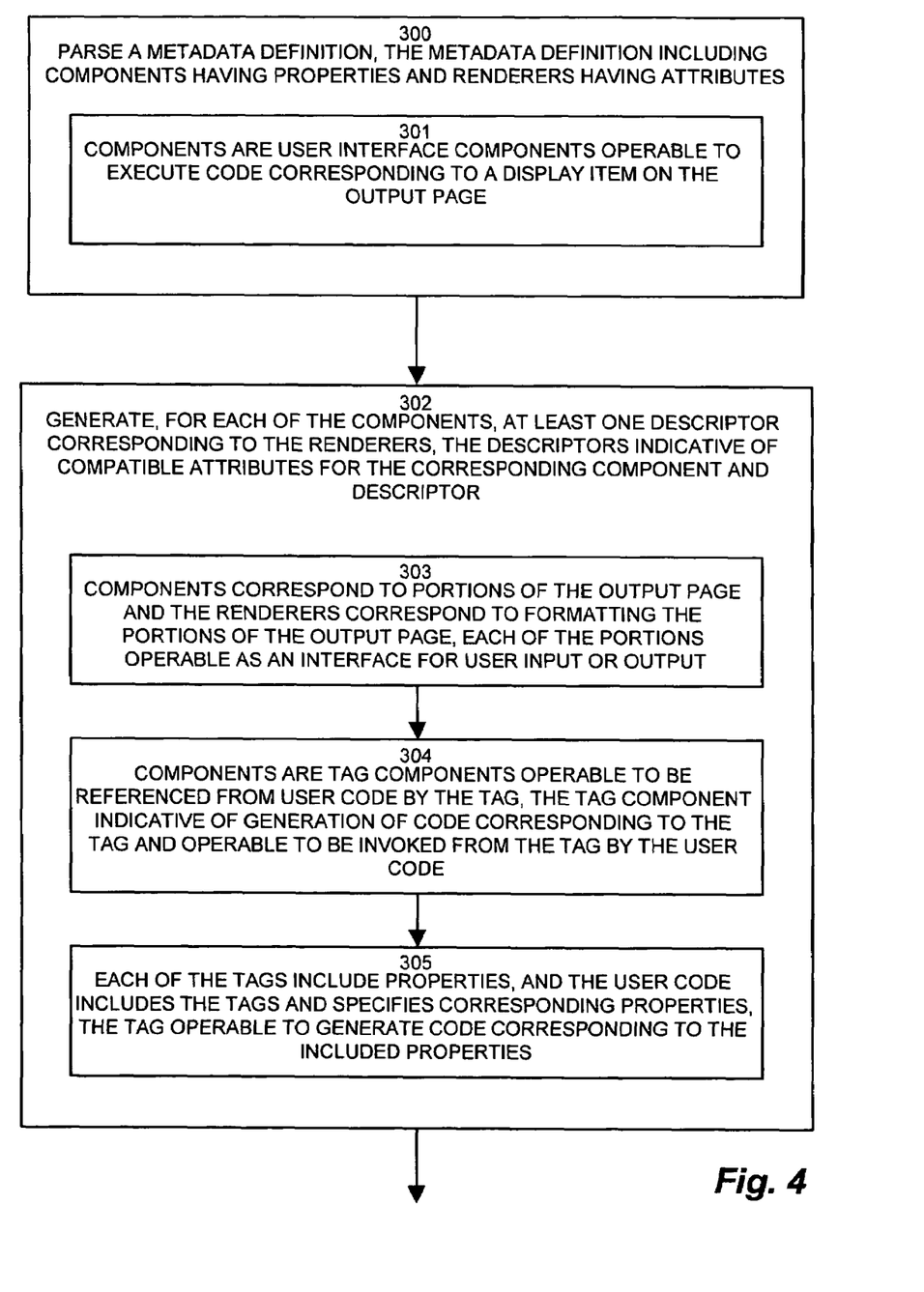
FIGS. 4-6 are a flowchart of tag library generation and deployment as in FIG. 2 in greater detail.
Figure 5:
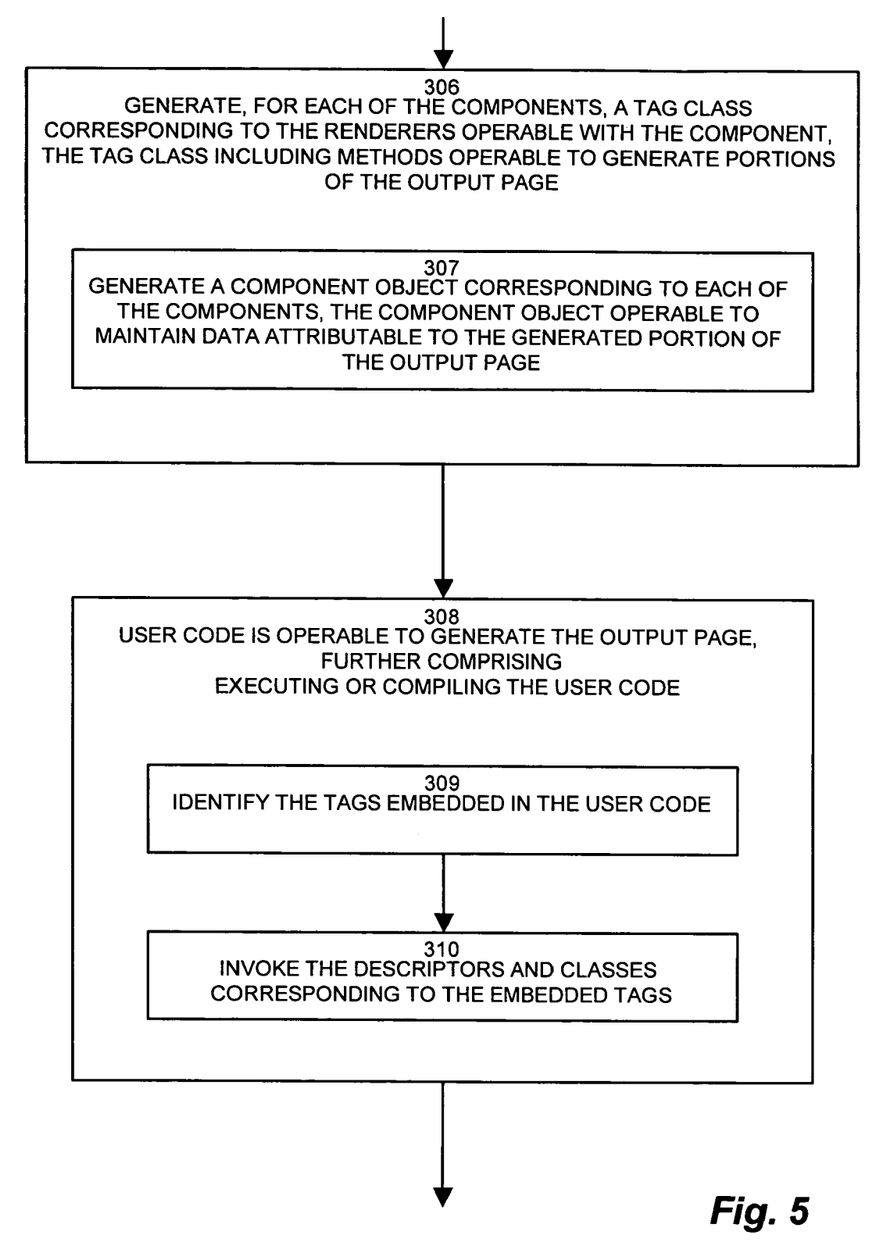
Figure 6:
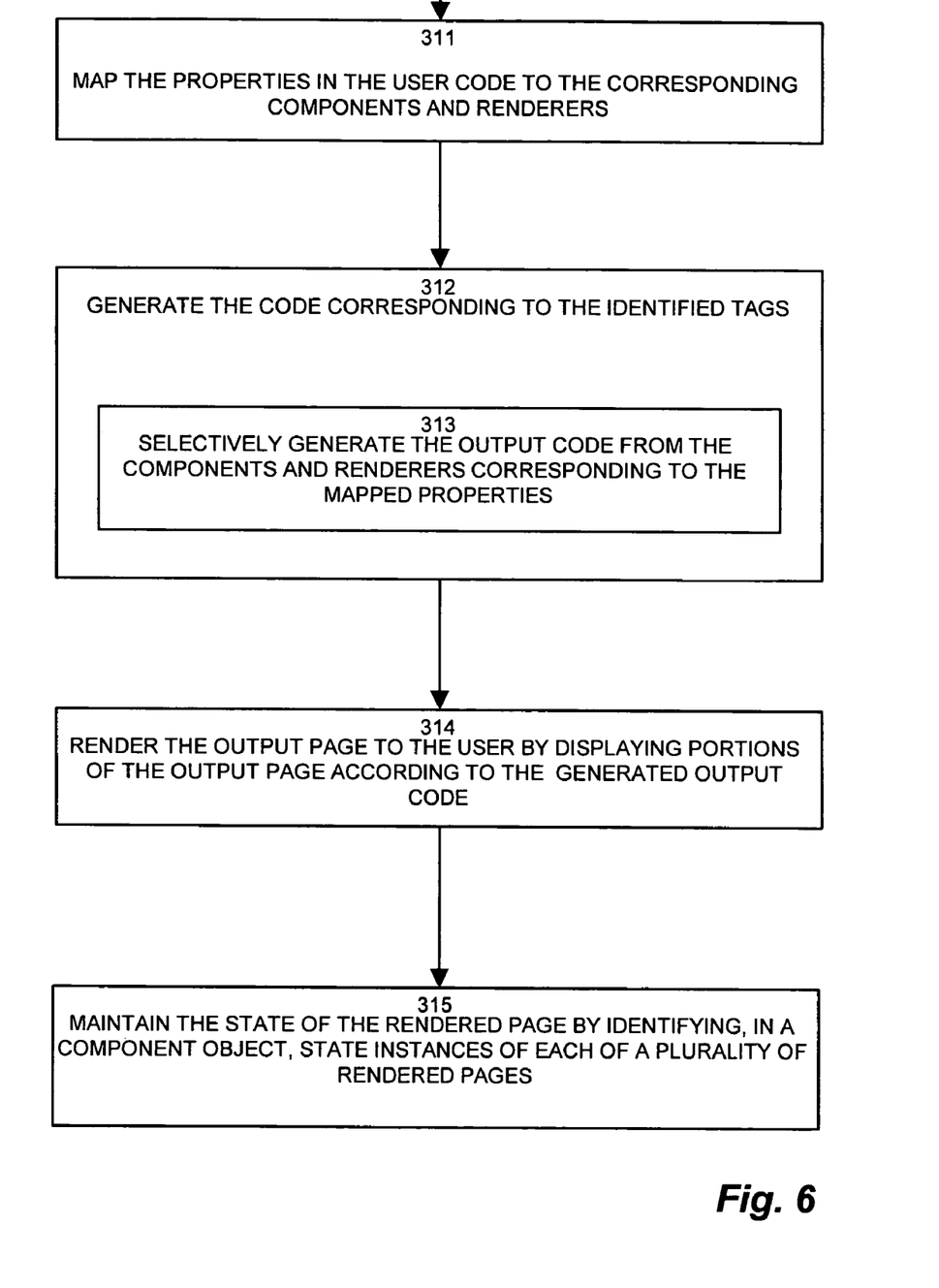

FIGS. 4 . . . 6 are a flowchart of generating and referencing a code library via metadata as in FIG. 2 in greater detail according to the block diagram of FIG. 3, including generating the output HTML page in a processing engine such as a JSP engine 180 and rendering the output page 164 to the user. Referring to FIGS. 3 . . . 6, the parser 116, such as a XML conversant SAX parser, parses the components 132 and renderers 136, as discussed above. In further detail, the components 132 are user interface components operable to execute code corresponding to a display item 145-N on the output page 164, as depicted at step 301. In the exemplary configuration, the user interface components are JSF components 132, receivable by the JSF component processor 118. Each JSF component 132 is a configurable and reusable element in the user interface (i.e. output HTML page). The JSF framework allows definition of a range of complexity, from simple elements such as a single button or text field, to compound elements such as a control tree or table.

The metadata 130 is shown in more detail in Appendix A, including code fragments of the component 132 (lines 45 . . . 82), renderers 136 (lines 85 . . . 124) and accompanying exemplary XML code for defining the tag library support objects, including the tag library descriptors 172 (lines 141 . . . 181), the tag handler classes 174-N (lines 185 . . . 229), and the component object 176 (lines 235 . . . 260). The exemplary metadata in appendix A illustrates the components 132 and corresponding properties 134, and the renderers 136 and associated attributes 138. Appendix A also illustrates exemplary XML code fragments which the tag library generator 120 processes to generate each of the support files 170, as disclosed and referenced further below.

The exemplary JSF component processor 118, or other token processor, sends the components and renderers to the tag library generator 120. As indicated above, the tag library generator generates supporting code facilitating the usage of the tags 142 from the user HTML code page 140. Usage of the tags 142 for employing the corresponding tag objects 144 involves availability of the support code 170 during runtime. The code generated by the tag library generator includes tag library descriptors 172, tag handler classes 174, and component objects 176. Another type of supporting code, the rendering adapter 190, adapts the components 132 on the rendered web page 184 for particular output forms, generally either HTML or WML (Wireless Markup Language), although other rendering forms are employable.

Accordingly, a tag library descriptor generator 122, in the tag library generator 120 generates, for each of the parsed components 132, one or more descriptors. The tag library descriptors (TLDs), as are known to those of skill in the art, define boundaries of properties for the tags, and therefore ensure that the properties set by the user 102 match those expected by the tag invoked Java object. The descriptors correspond to the renderers 136, in which descriptors are indicative of compatible attributes for the corresponding component and descriptor, as shown at step 302. It should be noted that, in the exemplary configuration herein including XML representations of metadata, the parser 116 omits attribute 136 names which are duplicates of property names 134, to avoid inconsistencies in the compiled JSF code receivable by the tag library generator 120. Such occurrences may be the result of erroneous inclusion of both entries in the metadata, and may otherwise result in an invalid program.

The tag library generator 122 processes components 132 which correspond to portions of the output page 164, and the renderers 136 which correspond to formatting the portions of the output page 164, in which each of the portions is operable as an interface for user input or output, as depicted at step 303. The components are tag components operable to be referenced from user code 140 by the tag 142, in which the tag component is indicative of generation of code corresponding to the tag and operable to be invoked from the tag by the user code, as disclosed at step 304. In the exemplary configuration, the portions of the output page 164 are JSF elements, as disclosed above. Further, each of the tags 142 may have one or more properties, and the user code 140 includes the tags and specifies corresponding properties, such that the tag 142 is operable to generate code corresponding to the included properties, as shown at step 305.

Therefore, step 302 and associated substeps 303-305 describe iterating through each component 132, and within each component 132, iterating through each applicable renderer 136. The resultant properties generally correspond to the union U of the components and the descriptors corresponding to the tag. It should be further noted that certain components, such as compound elements which operate as placeholders for subcomponents, may not have a corresponding descriptor. For example, if a given component has two properties, and has corresponding renderer A with 3 attributes and renderer B with 4 attributes, the resulting tags have 2+3=5 properties and 2+4=6 properties, respectively. This example also illustrates the significance of the supporting code generated when the number of components and descriptors increases. It is not unusual for an input field corresponding to a component to employ 30-40 attributes.

The resulting tag library descriptors 172 are in the form of updates to the tag library descriptor file, a common repository for such tag library descriptors defining properties for a tag library.

The handler class generator 124, in the tag library generator 120, then generates, for each of the components, a tag handler class 174 corresponding to the renderers operable with the component, in which the tag class including methods operable to generate portions of the output page 164, as depicted at step 306. The tag handler class generator 124 iterates through each of the components 132 parsed from the metadata 130, and for each iteration of a particular component 132, iterates through the corresponding renderers 136. The handler class generator 124 therefore generates a handler class 174-1 . . . 174-N for each component and corresponding renderer operable to be invoked via a tag 142 by the user. The handler class generator 122 iterates through the same component and renderer permutations for which the tag library descriptor 122 generated descriptors at step 302.

The component generator 126, also in the tag library generator 120, then generates a component object 176 corresponding to each of the components 132, in which the resulting component object 176 operable to maintain data attributable to the generated portion of the output page 164, as depicted at step 307. The component object 176 maintains the state of the generated web pages 124, such as in the shopping cart example given above. Note that the component object 176 is operable to maintain state for each of the tag handler classes 174 resulting from the metadata 130, and a runtime instantiation of the component object class 176 maintains the state for a particular web page. Therefore, the runtime JSP engine 180 employs a component object instantiation per output web page 124. In contrast, each component 132 results in a corresponding tag handler class 174-N per applicable renderer 136.

The JSP engine 180 invokes the generated code from the tag library generator, including the tag library descriptors 172, the tag handler classes 174, and the component object class 176 during execution of the user generated HTML page 140. The JSP engine 180 is operable to generate the output page 164 by executing or compiling the user code 140, as depicted at step 308. As indicated above, in the exemplary configuration, the JSP engine 180 compiles, via compiler 112, the HTML page 140 into a servlet 114 at runtime, i.e. a fetch of the HTML page by a remote user browser 162. The compiler 112 invokes the corresponding tag code 144-N, responsive to the tags 142-1, by retrieving the corresponding tag library entities (i.e. tag library descriptors 172, tag handler classes 174-N, and component object 176) to produce the servlet 114 including the compiled code 144. The resulting compiled servlet 114 is generally a collection of output statements and interleaved Java code 144-N corresponding to the compiled tags.

The compiler 112 identifies the tags 142-N embedded in the compiled servlet 114, as shown at step 309, and invokes the supporting code 172, 174-N, 176 accordingly to access the generated descriptors and classes corresponding to the embedded tags 144-N, as depicted at step 310. The generation of the servlet 114 may include a combination of compilation and interpretation, in order to generate the executable servlet 114 version of the web page for delivery to the user. In further detail, the compilation process includes mapping one or more properties A-1 . . . A-N, B-1 . . . B-N (not specifically shown) in the user code 140 to the corresponding components and renderers 132, 138, as depicted at step 311. Employing the tag library generator 120 generated support code 172, 174-N, 176, the compiler 112 generates the code corresponding to the invoked tags 144-N, as shown at step 312. In further detail, the compiler 112 selectively generates the output code from the components and renderers corresponding to the mapped properties 134, depending on the state (conditional execution) indicated by the user specified properties, as depicted at step 313.

The executer 182 then executes, or renders the compiled servlet 114 representing the output page 184 to the user by displaying portions of the output page 140' via the rendering adapter 190 and the compiled renderers 136 in the tag code 144-N, as disclosed at step 314. The renderer adapter 190, as indicated above, is operative to render the web page 184 or portions thereof according to particular output formats, such as HTML or WML. The network 150 transports the rendered web page 184 to the user's browser 160 for displaying the rendered portions 145-1, 145-2 resulting from the compiled code 144-1, 144-2, respectively, on the displayed web output page 164. The JSP engine 180 then maintains the state of the rendered page 184 by identifying, via the component object 176, state instances of each of the rendered pages 184, as depicted at step 315.

Those skilled in the art should readily appreciate that the programs and methods for generating and referencing a code library via metadata as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for generating and referencing a code library via metadata has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

APPENDIX A

Tag Library Generation From Component/Renderer Definitions

Java Server Faces Background

JavaServer Faces—A server-side user interface component framework for Java technology-based web applications.

JavaServer Faces technology simplifies building user interfaces for JavaServer applications. Developers of various skill levels can quickly and easily build web applications by: assembling reusable UI components in a page, connecting these components to an application data source, and wiring client-generated events to server-side event handlers.

Renderer—Adapt components to a specific markup language (ex: html, wml, . . . )

RenderKit—Library of Renderers. For JSP, they are represented as custom tag libraries.

Tag Library Generation

Developers can write their own custom components, as well as renderers (classes that render UI markup—ex: html/wml), and they can generate the corresponding tag library descriptor (tld) file and tag handler classes automatically using the tag library generator—which saves development time.

The generator uses component/renderer metadata described in an XML file (standard-html-renderkit.xml), and produces the tag library descriptor file (tld) and tag handler classes.

EXAMPLE

MetaData

Example describing how a generic "UICommand" component can be renderered as a button or link.

```
<component>
    <component-type>javax.faces.Command</component-type>
    <component-class>javax.faces.component.UICommand</component-class>
    <property>
    <description>
      MethodBinding representing the application action to
        invoke when this component is activated by the user.
        The expression must evaluate to a public method that
        takes no parameters, and returns a String (the logical
        outcome) which is passed to the NavigationHandler
        for this application.
    </description>
    <display-name>Application Action</display-name>
    <icon></icon>
    <property-name>action</property-name>
    <property-class>javax.faces.el.MethodBinding</property-class>
    </property>
    <property>
    <description>
      MethodBinding representing an action listener method
        that will be notified when this component is activated
        by the user. The expression must evaluate to a public
        method that takes an ActionEvent parameter, with a
        return type of void.
    </description>
    <display-name>Action Listener</display-name>
    <icon></icon>
    <property-name>actionListener</property-name>
    <property-class>javax.faces.el.MethodBinding</property-class>
    </property>
    .
    .
    .
    <component-extension>
    <component-family>javax.faces.Command</component-family>
    <renderer-type>javax.faces.Button</renderer-type>
    </component-extension>
</component>
<renderer>
    <component-family>javax.faces.Command</component-family>
    <renderer-type>javax.faces.Button</renderer-type>
    <renderer-class>&command-button-renderer-class;</renderer-class>
    <attribute>
    <description>
      CSS style(s) to be applied when this component is
        rendered.
    </description>
    <display-name>CSS Styles</display-name>
    <icon></icon>
    <attribute-name>style</attribute-name>
    <attribute-class>java.lang.String</attribute-class>
    <attribute-extension>
      <pass-through>true</pass-through>
    </attribute-extension>
    </attribute>
    <attribute>
    <description>
      Advisory title information about markup elements generated for this component.
    </description>
    <display-name>Advisory Title</display-name>
    <icon></icon>
    <attribute-name>title</attribute-name>
    <attribute-class>java.lang.String</attribute-class>
    <attribute-extension>
      <pass-through>true</pass-through>
    </attribute-extension>
    </attribute>
    .
    .
    .
</renderer>
<renderer>
    <component-family>javax.faces.Command</component-family>
    <renderer-type>javax.faces.Link</renderer-type>
    <renderer-class>&command-link-renderer-class;</renderer-class>
    .
    .
    .
</renderer>
```

Generator 1—Tag Lib Generator
Step 1: Generate TLD

A. generate preliminary TLD sections—XML header/Doc Type/Description/Validator

B. generate Tag element entries
build SortedMap of components keyed by component family
(componentsByComponentFamily)
build SortedMap of renderers keyed by component family
(renderersByComponentFamily)
iterate over renderersByComponentFamily
for each iteration:
pull out componentFamily
pull out List of renderers
iterate over renderers List
for each renderer:
  pull out rendererType
  output tagName (=componentFamily+rendererType)–from example meta data above, the tag names would be: commandButton, commandLink
  output tagClassName (=componentFamily+rendererType+"Tag")–from example meta data above, the tag class names would be: CommandButtonTag, CommandLinkTag
  output <tei-class> element
  output <body-content> element
  output <description> element
  generate tag attributes from component properties:
    pull out "Component" instance from componentsByComponentFamily map using "componentFamily"
    pull out "PropertyBean" array from "Component" instance
    for each "PropertyBean", output:
      <attribute> element
        <name> element
        <required> element (default is "false")
        <rtexprvalue> element (default is "false")
        <description> element
  generate tag attributes from renderer attributes:
    pull out "AttributeBean" array from "renderer" instance
    for each "AttributeBean", output the same info as for properties . . . .
  generate "binding" attribute (this <attribute> needs to exist for every <tag> element.
  output optional tag definitions—these would be defined in an external file. Essentially, they are components with no associated renderer.

Generator 2—Handler Class Generator
iterate over renderersByComponentFamily
for each iteration:
pull out "componentFamily"
pull out List of "renderers"
pull out "Component" instance
iterate over renderers List
for each renderer:
  pull out rendererType
  build tagClassName (=componentFamily+rendererType+"Tag")–from example meta data above, the tag class names would be: CommandButtonTag, CommandLinkTag
  open a new File with the tagClassName+".java" extension
  write out copyright/package declaration/import statements/class declaration
  generate tag handler instance variables from component properties and renderer attributes
  generate tag handler setter methods from component properties and renderer attributes
  generate tag handler general methods from component properties and renderer attributes:
    generate "getRendererType( )" method using "rendererType"
    generate "getComponentType( )" method using either:
      "componentType"+"rendererType"
      or, just "componentType" (if "componentType"="rendererType")
    generate "setProperties" method
      build "uicomponent" name ["UI"+"componentType"]
      generate "converter" code [if convertibleValueHolderComponents List contains "uicomponent" name]
      pull out "PropertyBean" List from "Component" instance
      for each "PropertyBean"
        pull out "propertyName", "propertyType" from "PropertyBean"
        generate "value binding" code [if "valueBindingEnabledProperties" List contains "propertyName"
        or, generate "method binding" code [if "methodBindingEnabledProperties" List contains "propertyName"
        or, generate simple component "setter".
      pull out "AttributeBean" List from "Renderer" instance
      for each "AttributeBean"
        pull out "attributeName", "attributeType" from "AttributeBean"
        generate code
  generate tag handler "Support" methods
    if a body tag—generate body tag methods
    or, generate support methods
    generate tag handler remaining methods Generator 3—Component Generator
pull out List of "Component" instances
for each "Component" instance:
pull out the "componentClass" value
build the component class name [componentClass+".java" extension]
create a new File with the component class name
generate copyright information
generate Java package declaration information
generate Java import statements
generate class javadocs from description information
generate Java class declaration
generate class constructor
generate COMPONENT_TYPE constant
generate instance variables, getter/setter methods for all non-duplicate properties of this component
  pull out "PropertyBean" array from "Component" instance
  for each "PropertyBean":
    generate instance variable from "PropertyBean" (using "name", "type" properties)
    generate javadocs for getter method
    generate getter method using "name", "type" properties from "PropertyBean"
    generate javadocs for setter method generate setter method using "name", "type" properties from "PropertyBean"
generate remaining methods
 generate "saveState"/"restoreState" methods for each "PropertyBean":
  generate "saveState" method contents
  generate "restoreState" method contents

What is claimed is:

1. An encoded set of processor based instructions tangibly embodied in a fixed medium of expression on a computer readable medium operable for execution by a processor for performing a method of generating a code library from metadata comprising:
   parsing a metadata definition, the metadata definition including components having properties and renderers having attributes;
   generating, for each of the components, at least one descriptor corresponding to the renderers, the descriptors indicative of compatible attributes for the corresponding component and descriptor, the compatible attributes mapping to the properties in the metadata definition;
   generating, for each of the components, a tag class corresponding to the renderers operable with the component, the tag class including methods operable to generate portions of an output page; and
   generating a component object corresponding to each of the components, the component object operable to maintain data attributable to generated portion of the output page; the components corresponding to portions of the output page and the renderers correspond to formatting the portions of the output page, each of the portions operable as an interface for user input or output.

2. The method of claim 1 wherein the components are indicative of user interface elements and are operable to execute code corresponding to a display item on the output page.

3. The method of claim 1 wherein the components are tag components operable to be referenced from user code by the tag, the tag component indicative of generation of code corresponding to the tag and operable to be invoked from the tag by the user code.

4. The method of claim 3 wherein each of the tags include properties, and the user code includes the tags and specifies corresponding properties, the tag operable to generate code corresponding to the included properties.

5. The method of claim 3 wherein the user code is operable to generate the output page, further comprising:
   executing the user code;
   identifying the tags embedded in the user code;
   invoking the descriptors and classes corresponding to the embedded tags; and
   generating the code corresponding to the identified tags.

6. The method of claim 3 further comprising:
   mapping the properties in the user code to the corresponding components and renderers;
     selectively generating the output code from the components and renderers corresponding to the mapped properties; and
     rendering the output page to the user by displaying portions of the output page according to the generated output code.

7. The method of claim 6 further comprising maintaining the state of the rendered page by identifying, in a component object, state instances of each of a plurality of rendered pages.

8. A method for generating code corresponding to user tags embedded in user code for displaying an output page comprising:
   parsing metadata having components including properties and renderers including attributes, the components indicative of user interface elements and the properties indicative of methods operable upon user activation, the renderers indicative of output protocols displaying the output page and the attributes indicative of output formats, the user code operable for specifying tag properties associated with each of the embedded tags, the tag properties mappable to the properties and attributes in the metadata;
   generating, from the metadata, for each of at least one of the components and corresponding renderers, descriptors indicative of tag properties applicable to each of the at least one component;
   generating, from the metadata, for each of at least one of the components and corresponding renderers, tag handler classes operable for performing screen display actions on the output page corresponding to the tag properties specified in the user code; and
   generating, from the metadata, a component class corresponding to the generated tag handler classes, the component class for providing component objects operable to maintain state of the generated tag handler classes for each of a plurality of output pages.

9. A tag library generator having an encoded set of processor based instructions tangibly embodied in a fixed medium of expression on a computer readable medium operable for execution by a processor for generating a code library of support code from metadata definitions comprising:
   a parser operable to parse the metadata definition, the metadata definition including components having properties and renderers having attributes;
   a tag library descriptor generator operable to generate, for each of the components, at least one descriptor corresponding to the renderers, the descriptors indicative of compatible attributes for the corresponding component and descriptor, the compatible attributes mapping to the properties in the metadata definition;
   a tag handler class generator operable to generate, for each of the components, a tag class corresponding to the renderers operable with the component, the tag class including methods operable to generate portions of an output page; and
   a component generator operable to generate a component object corresponding to each of the components, the component object operable to maintain data attributable to generated portion of the output page, the tag library generator in communication with a processing engine operable to maintain the state of successively rendered pages by identifying, in a component object, state instances of each of a plurality of rendered pages.

10. The tag library generator of claim 9 wherein the components correspond to portions of the output page and the renderers correspond to formatting the portions of the output page, each of the portions operable as an interface for user input or output.

11. The tag library generator of claim 9 wherein the components are indicative of user interface elements and are operable to execute code corresponding to a display item on the output page.

12. The tag library generator of claim 9 wherein the components are tag components operable to be referenced from user code by the tag, the tag component indicative of generation of code corresponding to the tag and operable to be invoked from the tag by the user code.

13. The tag library generator of claim 12 wherein each of the tags include properties, and the user code includes the tags and specifies corresponding properties, the tag operable to generate code corresponding to the included properties.

14. The tag library generator of claim 12 wherein the user code is operable to generate the output page, further operable to:
   execute the user code;
   identify the tags embedded in the user code;
   invoke the descriptors and classes corresponding to the embedded tags; and
   generate the code corresponding to the identified tags.

15. The tag library generator of claim 12 wherein the tag library generator is in communication with a processing engine operable to:
   map the properties in the user code to the corresponding components and renderers; and
      selectively generate the output code from the components and renderers corresponding to the mapped properties; and
      render the output page to the user by displaying portions of the output page according to the generated output code.

16. The tag library generator of claim 15 wherein the processing engine is operable to maintain the state of successively rendered pages by identifying, in a component object, state instances of each of a plurality of rendered pages.

17. A computer program product having a computer readable medium operable to store computer program logic in an encoded set of processor based instructions tangibly embodied in computer program code encoded thereon operable for execution by a processor for generating a code library from metadata comprising:
   computer program code for parsing a metadata definition, the metadata definition including components having properties and renderers having attributes the components indicative of user interface elements and the properties indicative of methods operable upon user activation, the renderers indicative of output protocols displaying the output page and the attributes indicative of output formats, the user code operable for specifying tag properties associated with each of the embedded tags, the tag properties mappable to the properties and attributes in the metadata;
   computer program code for generating, for each of the components, at least one descriptor corresponding to the renderers, the descriptors indicative of compatible attributes for the corresponding component and descriptor, the compatible attributes mapping to the properties in the metadata definition;
   computer program code for generating, for each of the components, a tag class corresponding to the renderers operable with the component, the tag class including methods operable to generate portions of an output page; and
   computer program code for generating a component object corresponding to each of the components, the component object operable to maintain data attributable to generated portion of the output page, the component object corresponding to the generated tag classes, the component object operable to maintain state of the generated tag handler classes for each of a plurality of output pages.

18. An encoded set of processor based instructions tangibly embodied in a fixed medium of expression on a computer readable medium operable for execution by a processor having program code for generating a code library from metadata comprising:
   program code for parsing a metadata definition, the metadata definition including components having properties and renderers having attributes;
   program code for generating, for each of the components, at least one descriptor corresponding to the renderers, the descriptors indicative of compatible attributes for the corresponding component and descriptor, the compatible attributes mapping to the properties in the metadata definition;
   program code for generating, for each of the components, a tag class corresponding to the renderers operable with the component, the tag class including methods operable to generate portions of an output page; and
   program code for generating a component object corresponding to each of the components, the component object operable to maintain data attributable to generated portion of the output page;
   program code for rendering the output page to the user by displaying portions of the output page according to the generated output code; and
   program code for maintaining the state of the rendered page by identifying, in a component object, state instances of each of a plurality of rendered pages.

19. A code generator including an encoded set of processor based instructions tangibly embodied in a fixed medium of expression on a computer readable medium operable for execution by a processor for generating a code library of support code from metadata comprising:
   means for parsing a metadata definition, the metadata definition including components having properties and renderers having attributes, the components corresponding to portions of the output page and the renderers corresponding to formatting the portions of the output page, each of the portions operable as an interface for user input or output;
   means for generating, for each of the components, at least one descriptor corresponding to the renderers, the descriptors indicative of compatible attributes for the corresponding component and descriptor, the compatible attributes mapping to the properties in the metadata definition;
   means for generating, for each of the components, a tag class corresponding to the renderers operable with the component, the tag class including methods operable to generate portions of an output page; and
   means for generating a component object corresponding to each of the components, the component object operable to maintain data attributable to generated portion of the output page, the components being tag components operable to be referenced from user code by the tag, the tag component indicative of generation of compiled code corresponding to the tag and operable to be invoked from the tag by the user code;
   means for mapping the properties in the user code to the corresponding components and renderers;
   means for selectively generating the compiled code from the components and renderers corresponding to the mapped properties; and
   means for rendering the output page to the user by displaying portions of the output page according to the generated compiled code.

* * * * *